(No Model.)
G. R. MATHEWS.
SADDLE GIRTH.
No. 584,949. Patented June 22, 1897.
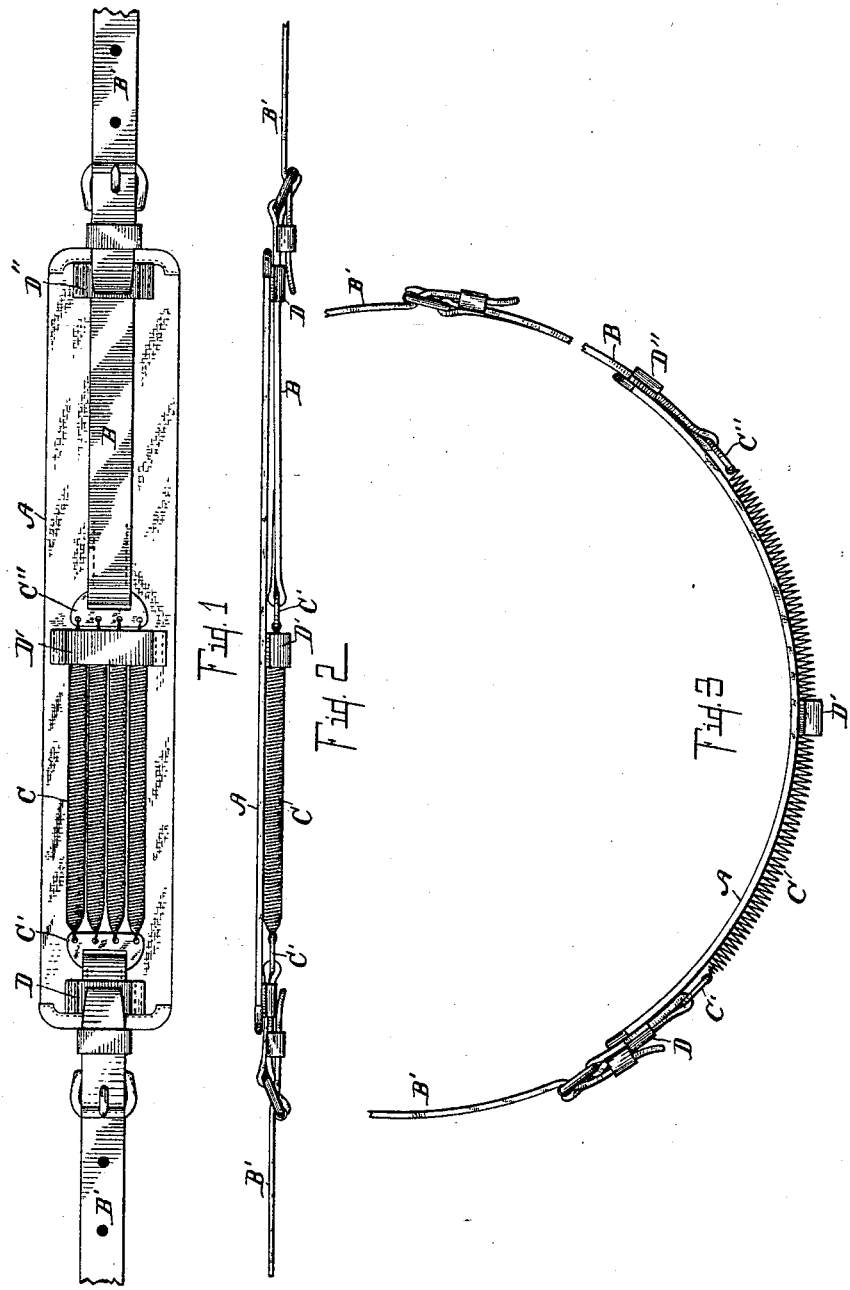
Witnesses:
Walter S. Wood
Orra E. Fulford
Inventor,
George R. Mathews
By Fred L. Chappell
Att'y.

UNITED STATES PATENT OFFICE.

GEORGE R. MATHEWS, OF KALAMAZOO, MICHIGAN.

SADDLE-GIRTH.

SPECIFICATION forming part of Letters Patent No. 584,949, dated June 22, 1897.

Application filed April 3, 1896. Serial No. 586,148. (No model.)

*To all whom it may concern:*

Be it known that I, GEORGE R. MATHEWS, a citizen of the United States, residing at the city of Kalamazoo, in the county of Kalamazoo and State of Michigan, have invented a certain new and useful Improvement in Saddle-Girths, of which the following is a specification.

My invention relates to improvements in girths for saddles or harnesses, and it relates more particularly to the belly-band portion of the same.

It is a well-known fact among horsemen that in placing the girth on an intelligent animal it will inflate its sides to the fullest extent to prevent the girth being drawn too tight; also, that the rigid and unyielding girth drawn tight upon an animal is a source of great inconvenience to it and by impairing the breathing capacity interferes with the best service of the animal.

The object of my invention is to provide an elastic girth which shall overcome all of these objections and at the same time be so secure that a saddle or harness is perfectly safe upon the animal.

A further object is to provide a construction of girth in which a metallic spring or springs can be used without interfering with the comfort of the animal or the arrangement of other parts of the harness.

Still further objects will appear in the detailed description.

I accomplish these objects of my invention by the devices and means described in the following specification or illustrated in the accompanying drawings, in which—

Figure 1 is an inverted plan view of a belly-band embodying all of the features of my invention. Fig. 2 is a side elevation of the same. Fig. 3 is a side elevation of the same as it appears in use upon an animal.

Similar letters of reference refer to similar parts throughout the several views.

In the drawings, A represents the broad flat heavy strap, which is the main strap of the belly-band and comes next to the animal.

B' B' are the buckle-straps, which project down from the back-strap to buckle to the belly-band.

A plate C' is secured to one end of the strap A, and another plate C'', corresponding thereto, is secured to a strap B, which passes through a loop B'' at the opposite end of the strap A. A spring or springs C connect the plates C' C'' together. There are four coiled springs placed side by side in this instance. A loop D' is secured to the center of the band A and serves as a keeper and a guide for the springs C, which pass freely through the same.

In use my improved belly-band is substituted for the ordinary belly-band and is drawn tight around the animal by the straps and buckles in the usual way. The animal fills out its chest, according to its habit, which puts tension on the springs C and expands the same, as indicated in Fig. 3. When the animal expels its breath, the springs pass easily over the broad strap A and compensate for the expansion and contraction due to this cause. On account of the peculiar construction I have shown with the broad heavy band next to the animal the springs act quickly and compensate so perfectly for the expansion and contraction that a saddle or harness is securely held in place by the same. The broad band protects the animal from any injurious effects due to the spring, and the peculiar location of the springs does not mar the appearance of the harness or girth or interfere with any other necessary part of the same.

Having thus described my improved girth in detail, I desire to state that it is capable of considerable variation without departing from my invention. The number of coiled springs C can be varied. I have used one large spring with success. The style of buckles used, the exact means of fastening, and the exact means of uniting parts together can be varied. The keeper and guide D' might be dispensed with in some instances, though it is of very great value in preventing a disarrangement of the springs at any time.

Having thus described my invention, what I claim as new, and desire to secure by Letters Patent, is—

1. In a girth the combination of the broad heavy strap A, for the inner band; plate C', secured to one end of the same; strap B, with a buckle to the end thereof; a loop D'', at the opposite end of the strap A, for securing and guiding strap B; a plate C'', secured to the end of the strap B, and springs C, connecting the plates C', and C'', together; and a guiding-loop D', toward the center of the strap A, to retain and guide the springs C, in place all coacting together for the purpose specified.

2. In a girth the combination of a broad heavy strap for the inner band; a spring secured by one end to one end of the same and positioned to the outside thereof; a strap secured to the opposite end of said spring and guided through a loop to the opposite end of said band; a loop over said springs to retain and guide them along the inner band for the purpose specified.

In witness whereof I have hereunto set my hand and seal in the presence of two witnesses.

GEORGE R. MATHEWS. [L. S.]

Witnesses:
VENE E. CHAPPELL,
WALTER S. WOOD.